United States Patent
Park et al.

(10) Patent No.: US 10,781,888 B2
(45) Date of Patent: Sep. 22, 2020

(54) PLANETARY GEAR TRAIN OF AUTOMATIC TRANSMISSION FOR VEHICLE

(71) Applicants: Hyundai Motor Company, Seoul (KR); Kia Motors Corporation, Seoul (KR)

(72) Inventors: Juhyeon Park, Suwon-si (KR); Seongwook Ji, Gunpo-si (KR); Hyun Sik Kwon, Seoul (KR); Ilhan Yoo, Hwasun-eup (KR); Seong Wook Hwang, Gunpo-si (KR); Ki Tae Kim, Incheon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 115 days.

(21) Appl. No.: 16/142,603

(22) Filed: Sep. 26, 2018

(65) Prior Publication Data
US 2019/0390748 A1 Dec. 26, 2019

(30) Foreign Application Priority Data

Jun. 22, 2018 (KR) .......................... 10-2018-0072148

(51) Int. Cl.
*F16H 3/66* (2006.01)
(52) U.S. Cl.
CPC .............. *F16H 3/666* (2013.01); *F16H 3/66* (2013.01); *F16H 2200/006* (2013.01); *F16H 2200/0073* (2013.01); *F16H 2200/0086* (2013.01); *F16H 2200/0091* (2013.01); *F16H 2200/201* (2013.01); *F16H 2200/2012* (2013.01); *F16H 2200/2046* (2013.01); *F16H 2200/2048* (2013.01); *F16H 2200/2097* (2013.01)

(58) Field of Classification Search
None
See application file for complete search history.

(56) References Cited

U.S. PATENT DOCUMENTS

| | | | | |
|---|---|---|---|---|
| 3,956,946 A * | 5/1976 | Murakami | ................ | F16H 3/66 475/276 |
| 6,705,969 B2 * | 3/2004 | Bucknor | ................... | F16H 3/66 475/275 |
| 8,083,630 B2 * | 12/2011 | Rice | .......................... | F16H 3/66 475/280 |
| 9,435,405 B2 * | 9/2016 | Etchason | .................. | F16H 3/62 |

\* cited by examiner

*Primary Examiner* — Colby M Hansen
(74) *Attorney, Agent, or Firm* — Morgan, Lewis & Bockius LLP

(57) ABSTRACT

A planetary gear train includes an input shaft, an output gear, first to third planetary gear sets respectively having first to third, fourth to sixth, and seventh to ninth rotation elements, a first shaft fixedly connected to the second rotation element and the input shaft, a second shaft fixedly connected to the sixth and eighth rotation elements and the output gear, a third shaft fixedly connected to the first rotation element and a transmission housing, a fourth shaft fixedly connected to the third rotation element, a fifth shaft fixedly connected to the fourth and seventh rotation elements, a sixth shaft fixedly connected to the fifth rotation element, and a seventh shaft fixedly connected to the ninth rotation element.

20 Claims, 4 Drawing Sheets

FIG. 2

| Shift-stage | C1 | C2 | C3 | C4 | B1 | B2 |
|---|---|---|---|---|---|---|
| D1 | ● | | | | | ● |
| D2 | | ● | | | | ● |
| D3 | | | ● | | | ● |
| D4 | | ● | ● | | | |
| D5 | ● | | ● | | | |
| D6 | | | ● | ● | | |
| D7 | ● | | | ● | | |
| D8 | | ● | | ● | | |
| REV1 | ● | | | | ● | |
| REV2 | | ● | | | ● | |

FIG. 4

| Shift-stage | C1 | C2 | C3 | C4 | B1 | B2 | B3 |
|---|---|---|---|---|---|---|---|
| D1 | | | | | | ● | ● |
| D2 | ● | | | | | ● | |
| D3 | | ● | | | | ● | |
| D4 | | | ● | | | ● | |
| D5 | | ● | ● | | | | |
| D6 | ● | | ● | | | | |
| D7 | | | ● | | | | ● |
| D8 | | | ● | ● | | | |
| D9 | | | | ● | | | ● |
| D10 | ● | | | ● | | | |
| D11 | | ● | | ● | | | |
| REV1 | | | | | ● | | ● |
| REV2 | ● | | | | ● | | |
| REV3 | | ● | | | ● | | |

PLANETARY GEAR TRAIN OF AUTOMATIC TRANSMISSION FOR VEHICLE

CROSS-REFERENCE TO RELATED APPLICATION

The present application claims priority to Korean Patent Application No. 10-2018-0072148 filed on Jun. 22, 2018, the entire contents of which is incorporated herein for all purposes by this reference.

BACKGROUND OF THE INVENTION

Field of the Invention

The present invention relates to an automatic transmission for a vehicle.

Description of Related Art

Research on realizing more shifting stages of an automatic transmission are undertaken to achieve enhancement of fuel consumption and better drivability, and recently, increase of oil price is triggering a hard competition in enhancing fuel consumption of a vehicle.

In this sense, research on an engine has been undertaken to achieve weight reduction and to enhance fuel consumption by so-called downsizing research on an automatic transmission has been performed to simultaneously provide better drivability and fuel consumption by achieving more shifting stages.

To achieve more shifting stages for an automatic transmission, the number of parts is typically increased, which may deteriorate installability, production cost, weight and/or power flow efficiency.

Therefore, to maximally enhance fuel consumption of an automatic transmission having more shifting stages, it is important for better efficiency to be derived by fewer number of parts.

In this respect, an eight-speed automatic transmission has been recently introduced, and a planetary gear train for an automatic transmission facilitating more shifting stages is under investigation.

An automatic transmission of eight or more shifting stages typically may include three to four planetary gear sets and five to seven engagement elements (friction elements), and may easily become lengthy, deteriorating installability.

In this regard, disposing planetary gear sets in parallel or employing dog clutches instead of wet-type control elements is attempted. However, such an arrangement may not be widely applicable, and using dog clutches may easily deteriorate shift-feel.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a planetary gear train of an automatic transmission for a vehicle facilitating at least eight forward speeds, providing better performance and fuel efficiency of a vehicle.

A planetary gear train according to an exemplary embodiment of the present invention may include an input shaft receiving an engine torque, an output gear for outputting a shifted torque, a first planetary gear set having first, second, and third rotation elements, a second planetary gear set having fourth, fifth, and sixth rotation elements, a third planetary gear set having seventh, eighth, and ninth rotation elements, a first shaft fixedly connected to the second rotation element and the input shaft, a second shaft fixedly connected to the sixth rotation element, the eighth rotation element, and the output gear, a third shaft fixedly connected to the first rotation element and a transmission housing, a fourth shaft fixedly connected to the third rotation element, a fifth shaft fixedly connected to the fourth rotation element and the seventh rotation element, a sixth shaft fixedly connected to the fifth rotation element, and a seventh shaft fixedly connected to the ninth rotation element.

The planetary gear train may further include four clutches each selectively connecting a corresponding pair among the first to seventh shafts, and two brakes each selectively connecting a corresponding shaft to the transmission housing.

The four clutches may include a first clutch disposed between the first shaft and the fifth shaft, a second clutch disposed between the fourth shaft and the fifth shaft, a third clutch disposed between the first shaft and the sixth shaft, and a fourth clutch disposed between the fourth shaft and the seventh shaft. The two brakes may include a first brake disposed between the sixth shaft and the transmission housing, and a second brake disposed between the seventh shaft and the transmission housing.

The first planetary gear set may be a single pinion planetary gear set having a first sun gear, a first planet carrier, and a first ring gear as the first, second, and third rotation elements. The second planetary gear set may be a single pinion planetary gear set having a second sun gear, a second planet carrier, and a second ring gear as the fourth, fifth, and sixth rotation elements. The third planetary gear set may be a single pinion planetary gear set having a third sun gear, a third planet carrier, and a third ring gear as the seventh, eighth, and ninth rotation elements.

The first, second, and third planetary gear sets may be disposed in the order of the second, third, first planetary gear sets from an engine side thereof.

The planetary gear train may further include a fourth planetary gear set having tenth, eleventh, and twelfth rotation elements, and an eighth shaft fixedly connected to the tenth rotation element. The eleventh rotation element may be fixedly connected to the first shaft. The twelfth rotation element may be fixedly connected to the fifth shaft.

The first planetary gear set may be a single pinion planetary gear set having a first sun gear, a first planet carrier, and a first ring gear as the first, second, and third rotation elements. The second planetary gear set may be a single pinion planetary gear set having a second sun gear, a second planet carrier, and a second ring gear as the fourth, fifth, and sixth rotation elements. The third planetary gear set may be a single pinion planetary gear set having a third sun gear, a third planet carrier, and a third ring gear as the seventh, eighth, and ninth rotation elements, The fourth planetary gear set may be a double pinion planetary gear set having a fourth sun gear, a fourth planet carrier, and a fourth ring gear as the tenth, eleventh, and twelfth rotation elements.

The planetary gear train may further include four clutches each selectively connecting a corresponding pair among the first to eight shafts, and three brakes each selectively connecting a corresponding shaft to the transmission housing.

The four clutches may include a first clutch disposed between the first shaft and the fifth shaft, a second clutch disposed between the fourth shaft and the fifth shaft, a third clutch disposed between the first shaft and the sixth shaft, and a fourth clutch disposed between the fourth shaft and the seventh shaft.

The three brakes may include a first brake disposed between the sixth shaft and the transmission housing, a second brake disposed between the seventh shaft and the transmission housing, and a third brake disposed between the eighth shaft and the transmission housing.

The first, second, third, and fourth planetary gear sets may be disposed in the order of the second, third, fourth, first planetary gear sets from an engine side thereof.

A planetary gear train according to an exemplary embodiment of the present invention may realize at least eight forward speeds and at least two reverse speeds by operating three or four planetary gear sets by controlling engagement elements of four clutches and two brakes or engagement elements of four clutches and three brakes.

Furthermore, a planetary gear train according to an exemplary embodiment of the present invention may substantially improve driving stability by realizing shifting stages appropriate for rotation speed of an engine due to multi-stages of an automatic transmission.

Furthermore, a planetary gear train according to an exemplary embodiment of the present invention maximize engine driving efficiency by multi-stages of an automatic transmission, and may improve power delivery performance and fuel consumption.

Furthermore, effects which may be obtained or expected from exemplary embodiments of the present invention are directly or suggestively described in the following detailed description. That is, various effects expected from exemplary embodiments of the present invention will be described in the following detailed description.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation chart for respective control elements at each shifting stage applicable to a planetary gear train according to various exemplary embodiments of the present invention.

FIG. 4 is an operation chart for respective control elements at each shifting stage applicable to a planetary gear train according to various exemplary embodiments of the present invention.

Figure 1:
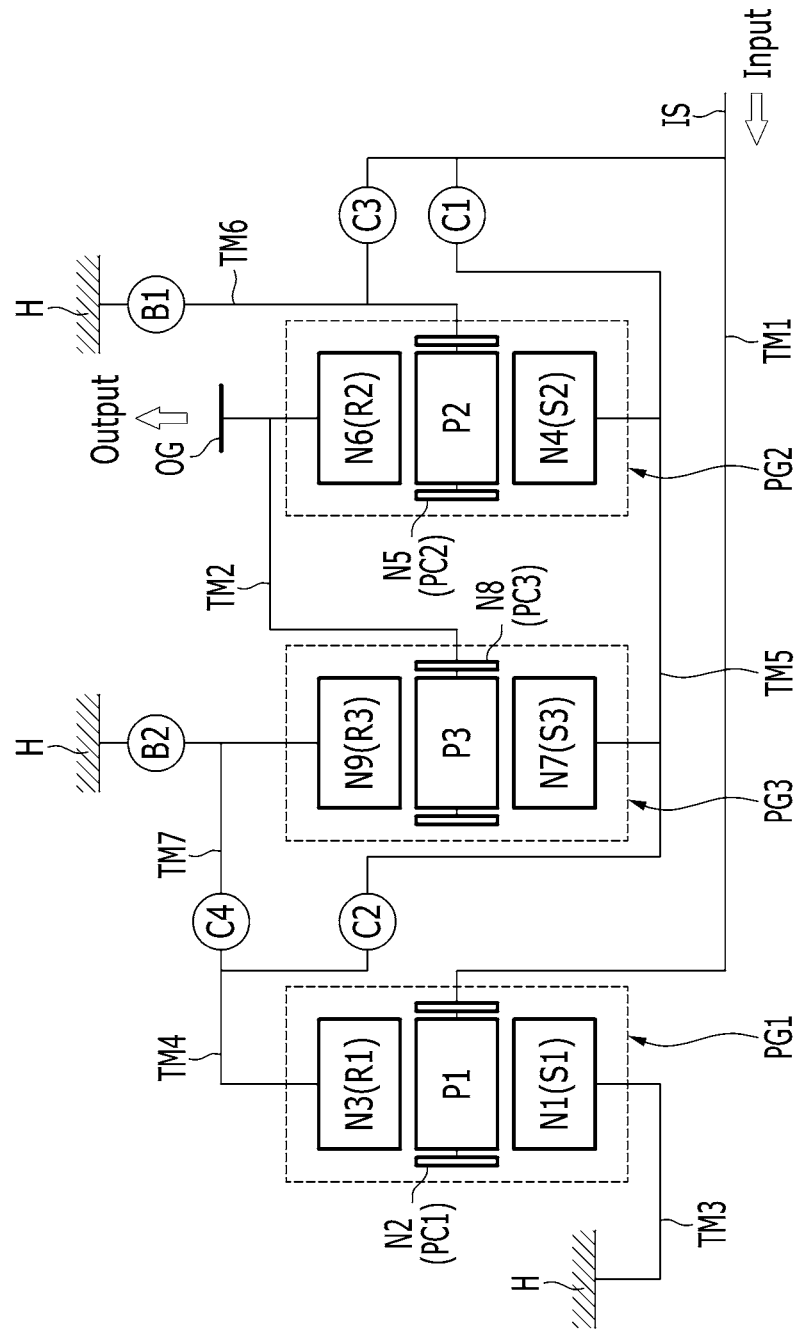
FIG. 1 is a schematic diagram of a planetary gear train according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, an exemplary embodiment of the present invention will be described in detail with reference to drawings.

The drawings and description are to be regarded as illustrative in nature and not restrictive, and like reference numerals designate like elements throughout the specification.

In the following description, dividing names of components into first, second, and the like is to divide the names because the names of the components are the same as each other and an order thereof is not particularly limited.

FIG. 1 is a schematic diagram of a planetary gear train according to various exemplary embodiments of the present invention.

Referring to FIG. 1, a planetary gear train according to various exemplary embodiments of the present invention includes first, second, and third planetary gear sets PG1, PG2, and PG3 disposed on a same axis, an input shaft IS, an output gear OG, seven shafts TM1 to TM7 interconnecting rotation elements of the first, second, and third planetary gear sets PG1, PG2, and PG3, engagement elements of four clutches C1 to C4 and two brakes B1 and B2, and a transmission housing H.

A torque received from an engine through the input shaft IS is changed by cooperative operation of the first, second, and third planetary gear sets PG1, PG2, and PG3, and a shifted torque is output through the output gear OS.

In the various exemplary embodiments of the present invention, the planetary gear sets are disposed in the order of the second, third, and first planetary gear set PG2, PG3, and PG1, from an engine side, i.e., from an input side thereof.

The input shaft IS is an input member and the torque from a crankshaft of an engine is input into the input shaft IS, after being torque-converted through a torque converter.

The output gear OG is an output element, and outputs a shifted driving torque to a driveshaft through a differential apparatus.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

In the first, second, and third planetary gear sets PG1, PG2, and PG3, the fourth rotation element N4 and the seventh rotation element N7 are fixedly interconnected, and the sixth rotation element N6 and the eighth rotation element N8 are fixedly interconnected, and seven shafts TM1 to TM7 are formed.

The seven shafts TM1 to TM7 are hereinafter described in detail.

The first shaft TM1 is fixedly connected to the second rotation element N2 (first planet carrier PC1), and fixedly connected to the input shaft IS, always acting as an input element.

The second shaft TM2 is fixedly connected to the sixth rotation element N6 (second ring gear R2) and the eighth rotation element N8 (third planet carrier PC3), and fixedly connected to the output gear OG thereby always acting as an output element.

The third shaft TM3 is fixedly connected to the first rotation element N1 (first sun gear S1), and fixedly connected to the transmission housing H thereby always acting as a fixed element.

The fourth shaft TM4 is fixedly connected to the third rotation element N3 (first ring gear R1).

The fifth shaft TM5 is fixedly connected to the fourth rotation element N4 (second sun gear S2) and the seventh rotation element N7 (third sun gear S3), and selectively connectable to the input shaft IS, selectively acting as an input element.

The sixth shaft TM6 is fixedly connected to the fifth rotation element N5 (second planet carrier PC2), selectively connectable to the input shaft IS thereby selectively acting as an input element, and selectively connectable to the transmission housing H thereby selectively acting as a fixed element.

The seventh shaft TM7 is fixedly connected to the ninth rotation element N9 (third ring gear R3), and selectively connectable to the transmission housing H thereby selectively acting as a fixed element.

Each of the seven shafts TM1 to TM7 may be a rotation member that fixedly interconnects the input and output shafts and rotation elements of the planetary gear sets PG1, PG2, and PG3, or may be a rotation member that selectively interconnects a rotation element to the transmission housing H, or may be a fixed member fixed to the transmission housing H.

In the disclosure, when two or more members are described to be "fixedly connected", where the member may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

The first shaft TM1 is selectively connectable to the fifth shaft TM5 and the sixth shaft TM6 respectively, and the fourth shaft TM4 is selectively connectable to the fifth shaft TM5 and the seventh shaft TM7 respectively.

The sixth shaft TM6 and the seventh shaft TM7 are selectively connectable to the transmission housing H thereby selectively acting as a fixed element.

Four engagement elements of four clutches C1, C2, C3, and C4 are disposed between the seven shafts TM1 to TM7, the input shaft IS, and the output gear OG, to form selective connections.

Two engagement elements of two brakes B1 and B2 are disposed between the seven shafts TM1 to TM7 and the transmission housing H, to form selective connections.

The six engagement elements of the four clutches C1 to C4 and the two brakes B1 and B2 are disposed as follows.

The first clutch C1 is disposed between the first shaft TM1 and the fifth shaft TM5, and selectively connects the first shaft TM1 and the fifth shaft TM5, controlling power delivery therebetween.

The second clutch C2 is disposed between the fourth shaft TM4 and the fifth shaft TM5, and selectively connects the first shaft TM4 and the fifth shaft TM5, controlling power delivery therebetween.

The third clutch C3 is disposed between the first shaft TM1 and the sixth shaft TM6, and selectively connects the first shaft TM1 and the sixth shaft TM6, controlling power delivery therebetween.

The fourth clutch C4 is disposed between the fourth shaft TM4 and the seventh shaft TM7, and selectively connects the fourth shaft TM4 and the seventh shaft TM7, controlling power delivery therebetween.

The first brake B1 is disposed between the sixth shaft TM6 and the transmission housing H, and selectively connects the sixth shaft TM6 to the transmission housing H.

The second brake B2 is disposed between the seventh shaft TM7 and the transmission housing H, and selectively connects the seventh shaft TM7 to the transmission housing H.

The engagement elements of the first, second, third, and fourth clutches C1, C2, C3, and C4, and the first and second brakes B1 and B2 may be realized as multi-plate hydraulic pressure friction devices that are frictionally engaged by hydraulic pressure, however, it may not be understood to be limited thereto, since various other configuration that are electrically controllable may be available.

FIG. 2 is an operation chart for respective control elements at each shifting stage applicable to a planetary gear train according to various exemplary embodiments of the present invention.

Referring to FIG. 2, a planetary gear train according to an exemplary embodiment of the present invention realizes eight forward speeds and two reverse speeds by operating two engagements among the first, second, third, and fourth clutches C1, C2, C3, and C4 and the first and second brakes B1 and B2.

In the first forward speed D1, the first clutch C1 and the second brake B2 are simultaneously operated.

As a result, the first shaft TM1 and the fifth shaft TM5 are connected by the operation of the first clutch C1. In the instant state, the input torque is input to the first shaft TM1 and the fifth shaft TM5.

In such a state, as well as the third shaft TM3 always acting as a fixed element, the seventh shaft TM7 acts as a fixed element by the operation of the second brake B2, realizing the first forward speed and outputting a shifted torque to the output gear OG connected to the second shaft TM2.

In the second forward speed D2, the second clutch C2 and the second brake B2 are simultaneously operated.

As a result, the fourth shaft TM4 and the fifth shaft TM5 are connected by the operation of the second clutch C2. In the instant state, the input torque is input to the first shaft TM1.

In such a state, as well as the third shaft TM3 always acting as a fixed element, the seventh shaft TM7 acts as a fixed element by the operation of the second brake B2, realizing the second forward speed and outputting a shifted torque to the output gear OG connected to the second shaft TM2.

In the third forward speed D3, the third clutch C3 and the second brake B2 are simultaneously operated.

As a result, the first shaft TM1 and the sixth shaft TM6 are connected by the operation of the third clutch C3. In the instant state, the input torque is input to the first shaft TM1 and the sixth shaft TM6.

In such a state, as well as the third shaft TM3 always acting as a fixed element, the seventh shaft TM7 acts as a fixed element by the operation of the second brake B2, realizing the third forward speed and outputting a shifted torque to the output gear OG connected to the second shaft TM2.

In the fourth forward speed D4, the second and third clutches C2 and C3 are simultaneously operated.

As a result, the fourth shaft TM4 and the fifth shaft TM5 are connected by the operation of the second clutch C2, and the first shaft TM1 and the sixth shaft TM6 are connected by the operation of the third clutch C3. In the instant state, the input torque is input to the first shaft TM1 and the sixth shaft TM6.

In such a state, the third shaft TM3 always acts as a fixed element, realizing the fourth forward speed and outputting a shifted torque to the output gear OG connected to the second shaft TM2.

In the fifth forward speed D5, the first and third clutches C1 and C3 are simultaneously operated.

As a result, the first shaft TM1 and the fifth shaft TM5 are connected by the operation of the first clutch C1, and the first shaft TM1 and the sixth shaft TM6 are connected by the operation of the third clutch C3. In the instant state, the input torque is input to the first shaft TM1, the fifth shaft TM5, and the sixth shaft TM6.

As such, the second planetary gear set PG2 integrally rotates by simultaneous input from the fifth shaft TM5 and the sixth shaft TM6 and outputs an input torque, realizing the fifth forward speed and outputting a shifted torque to the output gear OG connected to the second shaft TM2.

In the sixth forward speed D6, the third and fourth clutches C3 and C4 are simultaneously operated.

As a result, the first shaft TM1 and the sixth shaft TM6 are connected by the operation of the third clutch C3, and the fourth shaft TM4 and the seventh shaft TM7 are connected by the operation of the fourth clutch C4. In the instant state, the input torque is input to the first shaft TM1 and the sixth shaft TM6.

In such a state, the third shaft TM3 always acts as a fixed element, realizing the sixth forward speed and outputting a shifted torque to the output gear OG connected to the second shaft TM2.

In the seventh forward speed D7, the first and fourth clutches C1 and C4 are simultaneously operated.

As a result, the first shaft TM1 and the fifth shaft TM5 are connected by the operation of the first clutch C1, and the fourth shaft TM4 and the seventh shaft TM7 are connected by the operation of the fourth clutch C4. In the instant state, the input torque is input to the first shaft TM1 and the fifth shaft TM5.

In such a state, the third shaft TM3 always acts as a fixed element, realizing the seventh forward speed and outputting a shifted torque to the output gear OG connected to the second shaft TM2.

In the eighth forward speed D8, the second and fourth clutches C2 and C4 are simultaneously operated.

As a result, the fourth shaft TM4 and the fifth shaft TM5 are connected by the operation of the second clutch C2, and the fourth shaft TM4 and the seventh shaft TM7 are connected by the operation of the fourth clutch C4. In the instant state, the input torque is input to the first shaft TM1.

In such a state, the third shaft TM3 always acts as a fixed element, realizing the eighth forward speed and outputting a shifted torque to the output gear OG connected to the second shaft TM2.

In the reverse first speed REV1, the first clutch C1 and the first brake B1 are simultaneously operated.

As a result, the first shaft TM1 and the fifth shaft TM5 are connected by the operation of the first clutch C1. In the instant state, the input torque is input to the first shaft TM1 and the fifth shaft TM5.

In such a state, as well as the third shaft TM3 always acting as a fixed element, the sixth shaft TM6 acts as a fixed element by the operation of the first brake B1, realizing the reverse first speed and outputting a shifted torque to the output gear OG connected to the second shaft TM2.

In the reverse second speed REV2, the second clutch C2 and the first brake B1 are simultaneously operated.

As a result, the fourth shaft TM4 and the fifth shaft TM5 are connected by the operation of the second clutch C2. In the instant state, the input torque is input to the first shaft TM1.

In such a state, as well as the third shaft TM3 always acting as a fixed element, the sixth shaft TM6 acts as a fixed element by the operation of the first brake B1, realizing the reverse second speed and outputting a shifted torque to the output gear OG connected to the second shaft TM2.

Figure 3:
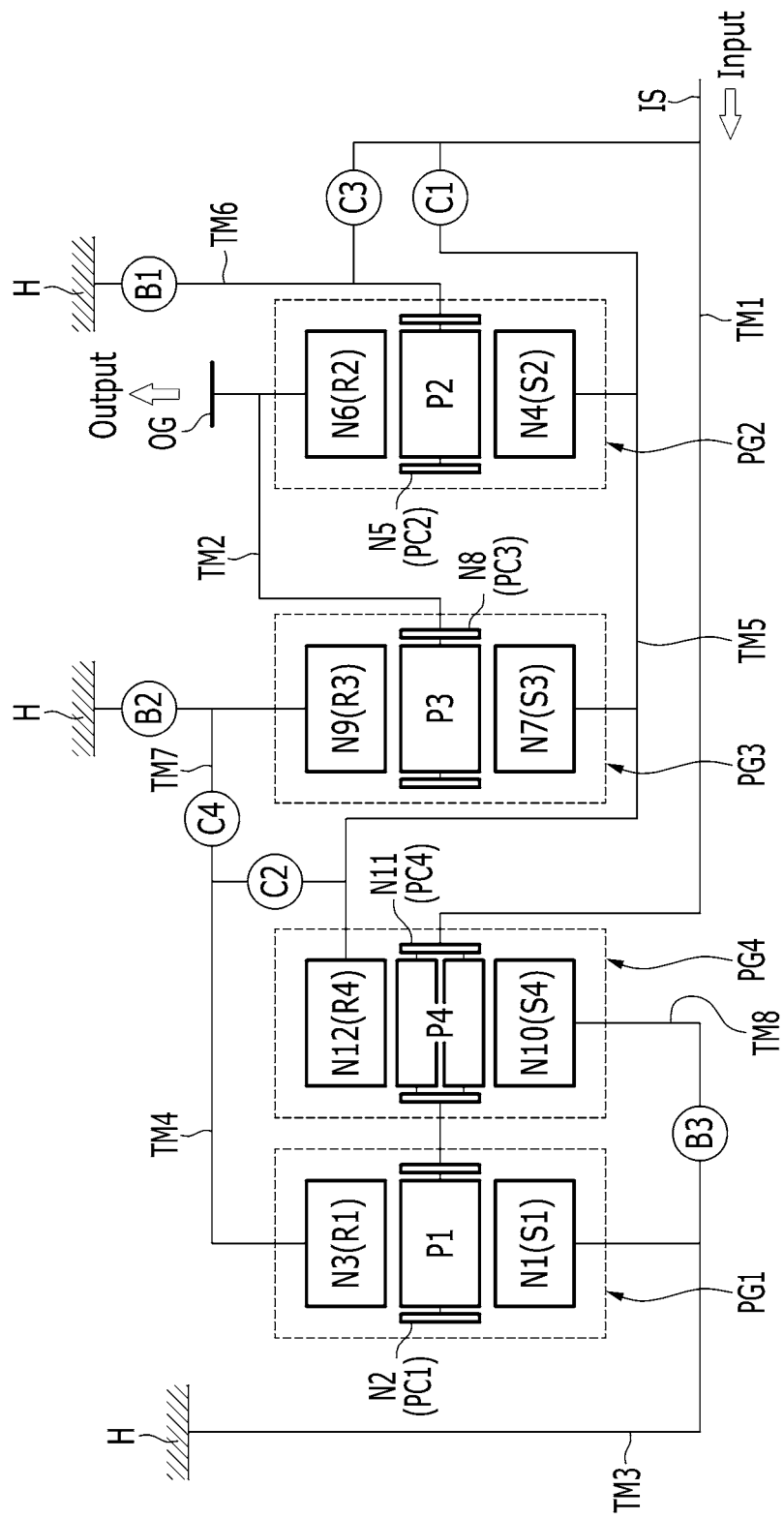
FIG. 3 is a schematic diagram of a planetary gear train according to various exemplary embodiments of the present invention.

FIG. 3 is a schematic diagram of a planetary gear train according to various exemplary embodiments of the present invention.

As shown in FIG. 1, a planetary gear train according to various exemplary embodiments of the present invention includes three single pinion planetary gear sets of first, second, and third planetary gear sets PG1, PG2, and PG3. However, referring to FIG. 3, the various exemplary embodiments of the present invention further includes a fourth planetary gear set PG4 of a double pinion planetary gear set.

In the various exemplary embodiments of the present invention, the planetary gear sets are disposed on the input shaft IS in the order of second, third, fourth, and first planetary gear sets PG2, PG3, PG4, and PG1, from an engine side, i.e., from an input side thereof.

The fourth planetary gear set PG4 includes a fourth sun gear S4 as a tenth rotation element N10, a fourth planet carrier PC4 as an eleventh rotation element N11, and a fourth ring gear R4 a twelfth rotation element N12.

In comparison with the various exemplary embodiments of the present invention, the various exemplary embodiments further include an eighth shaft TM8 fixedly connected to the tenth rotation element N10 of the fourth planetary gear set PG4. The eighth shaft TM8 is selectively connectable to the transmission housing H through a third brake B3 and selectively acts as a fixed element.

The eleventh rotation element N11 of the fourth planetary gear set PG4 is fixedly connected to the first shaft TM1, and the twelfth rotation element N12 of the fourth planetary gear set PG4 is fixedly connected to the fifth shaft TM5.

It will be obviously understood that the various exemplary embodiments differ from the various exemplary embodiments only in the above features, and other features remain the same.

A planetary gear train according to various exemplary embodiments is hereinafter described in detail with reference to the above differences.

Referring to FIG. 3, a planetary gear train according to various exemplary embodiments includes first, second, third, and fourth planetary gear sets PG1, PG2, PG3, and PG4 disposed on a same axis, an input shaft IS, an output gear OG, eight shafts TM1 to TM8 interconnecting rotation elements of the first, second, third, and fourth planetary gear sets PG1, PG2, PG3, and PG4, engagement elements of four clutches C1 to C4 and three brakes B1, B2, and B3, and a transmission housing H.

A torque received from an engine through the input shaft IS is changed by cooperative operation of the first, second, third, and fourth planetary gear sets PG1, PG2, PG3, and PG4, and a shifted torque is output through the output gear OS.

In the various exemplary embodiments of the present invention, the planetary gear sets are disposed on the input shaft IS in the order of the second, third, fourth, and first planetary gear sets PG2, PG3, PG4, and PG1, from an engine side, i.e., from an input side thereof.

The input shaft IS is an input member and the torque from a crankshaft of an engine is input into the input shaft IS, after being torque-converted through a torque converter.

The output gear OG is an output element, and outputs a shifted driving torque to a driveshaft through a differential apparatus.

The first planetary gear set PG1 is a single pinion planetary gear set, and includes a first sun gear S1, a first planet carrier PC1 rotatably supporting a plurality of first pinion gears P1 externally gear-meshed with the first sun gear S1, and a first ring gear R1 internally gear-meshed with the plurality of first pinion gears P1. The first sun gear S1 acts as a first rotation element N1, the first planet carrier PC1 acts as a second rotation element N2, and the first ring gear R1 acts as a third rotation element N3.

The second planetary gear set PG2 is a single pinion planetary gear set, and includes a second sun gear S2, a second planet carrier PC2 rotatably supporting a plurality of second pinion gears P2 externally gear-meshed with the second sun gear S2, and a second ring gear R2 internally gear-meshed with the plurality of second pinion gears P2. The second sun gear S2 acts as a fourth rotation element N4, the second planet carrier PC2 acts as a fifth rotation element N5, and the second ring gear R2 acts as a sixth rotation element N6.

The third planetary gear set PG3 is a single pinion planetary gear set, and includes a third sun gear S3, a third planet carrier PC3 rotatably supporting a plurality of third pinion gears P3 externally gear-meshed with the third sun gear S3, and a third ring gear R3 internally gear-meshed with the plurality of third pinion gears P3. The third sun gear S3 acts as a seventh rotation element N7, the third planet carrier PC3 acts as an eighth rotation element N8, and the third ring gear R3 acts as a ninth rotation element N9.

The fourth planetary gear set PG4 is a double pinion planetary gear set, and includes a fourth sun gear S4, a fourth planet carrier PC4 rotatably supporting a plurality of fourth pinion gears P4 of which internally disposed pinion gears are externally gear-meshed with the fourth sun gear S4, and a fourth ring gear R4 internally gear-meshed with externally disposed pinion gears of the plurality of fourth pinion gears P4. The fourth sun gear S4 acts as a tenth rotation element N10, fourth planet carrier PC4 acts as an eleventh rotation element N11, and the fourth ring gear R4 acts as a twelfth rotation element N12.

In the first, second, third, and fourth planetary gear sets PG1, PG2, PG3, and PG4, the second rotation element N2 and the eleventh rotation element N11 are fixedly interconnected, the fourth rotation element N4, the seventh rotation element N7, the twelfth rotation element N12 are fixedly interconnected, the sixth rotation element N6 and the eighth rotation element N8 are fixedly interconnected, and eight shafts TM1 to TM8 are formed.

The eight shafts TM1 to TM8 are hereinafter described in detail.

The first shaft TM1 is fixedly connected to the second rotation element N2 (first planet carrier PC1) and the eleventh rotation element N11 (fourth planet carrier PC4), and fixedly connected to the input shaft IS, always acting as an input element.

The second shaft TM2 is fixedly connected to the sixth rotation element N6 (second ring gear R2) and the eighth rotation element N8 (third planet carrier PC3), and fixedly connected to the output gear OG thereby always acting as an output element.

The third shaft TM3 is fixedly connected to the first rotation element N1 (first sun gear S1), and fixedly connected to the transmission housing H thereby always acting as a fixed element.

The fourth shaft TM4 is fixedly connected to the third rotation element N3 (first ring gear R1).

The fifth shaft TM5 is fixedly connected to the fourth rotation element N4 (second sun gear S2), the seventh rotation element N7 (third sun gear S3), and the twelfth rotation element N12 (fourth ring gear R4), and selectively connectable to the input shaft IS, selectively acting as an input element.

The sixth shaft TM6 is fixedly connected to the fifth rotation element N5 (second planet carrier PC2), selectively connectable to the input shaft IS thereby selectively acting as an input element, and selectively connectable to the transmission housing H thereby selectively acting as a fixed element.

The seventh shaft TM7 is fixedly connected to the ninth rotation element N9 (third ring gear R3), and selectively connectable to the transmission housing H thereby selectively acting as a fixed element.

The eighth shaft TM8 is fixedly connected to the tenth rotation element N10 (fourth sun gear S4), and selectively connectable to the transmission housing H thereby selectively acting as a fixed element.

Each of the eight shafts TM1 to TM8 may be a rotation member that fixedly interconnects the input and output shafts and rotation elements of the planetary gear sets PG1, PG2, PG3, PG4, and PG5, or may be a rotation member that selectively interconnects a rotation element to the transmission housing H, or may be a fixed member fixed to the transmission housing H.

In the disclosure, when two or more members are described to be "fixedly connected", where the member may be any of a shaft, an input shaft, an output shaft, a rotation member, and a transmission housing, it means that the fixedly connected members always rotate at a same speed.

When two or more members are described to be "selectively connectable" by an engagement element, it means that the selectively connectable members rotate separately when the engagement element is not engaged, and rotates at a same speed when the engagement element is engaged. It may be understood that in the case that a member is "selectively connectable" with a transmission housing by an engagement element, the member may be stationary when the engagement element is engaged.

The first shaft TM1 is selectively connectable to the fifth shaft TM5 and the sixth shaft TM6 respectively, and the fourth shaft TM4 is selectively connectable to the fifth shaft TM5 and the seventh shaft TM7 respectively.

The sixth shaft TM6, the seventh shaft TM7, and the eighth shaft TM8 are selectively connectable to the transmission housing H thereby selectively acting as a fixed element.

Four engagement elements of four clutches C1, C2, C3, and C4 are disposed between the eight shafts TM1 to TM8, the input shaft IS, and the output gear OG, to form selective connections.

Two engagement elements of three brakes B1, B2, and B3 are disposed between the eight shafts TM1 to TM8 and the transmission housing H, to form selective connections.

The seven engagement element of the four clutches C1 to C4 and the three brakes B1 to B3 are disposed as follows.

The first clutch C1 is disposed between the first shaft TM1 and the fifth shaft TM5, and selectively connects the first shaft TM1 and the fifth shaft TM5, controlling power delivery therebetween.

The second clutch C2 is disposed between the fourth shaft TM4 and the fifth shaft TM5, and selectively connects the first shaft TM4 and the fifth shaft TM5, controlling power delivery therebetween.

The third clutch C3 is disposed between the first shaft TM1 and the sixth shaft TM6, and selectively connects the first shaft TM1 and the sixth shaft TM6, controlling power delivery therebetween.

The fourth clutch C4 is disposed between the fourth shaft TM4 and the seventh shaft TM7, and selectively connects the fourth shaft TM4 and the seventh shaft TM7, controlling power delivery therebetween.

The first brake B1 is disposed between the sixth shaft TM6 and the transmission housing H, and selectively connects the sixth shaft TM6 to the transmission housing H.

The second brake B2 is disposed between the seventh shaft TM7 and the transmission housing H, and selectively connects the seventh shaft TM7 to the transmission housing H.

The third brake B3 is disposed between the eighth shaft TM8 and the transmission housing H, and selectively connects the eighth shaft TM8 to the transmission housing H.

The engagement elements of the first, second, and third clutches C1, C2, and C3 and the first, second, and third brakes B1, B2, and B3 may be realized as multi-plate hydraulic pressure friction devices that are frictionally engaged by hydraulic pressure, however, it may not be understood to be limited thereto, since various other configuration that are electrically controllable may be available.

FIG. 4 is an operation chart for respective control elements at each shifting stage applicable to a planetary gear train according to various exemplary embodiments of the present invention.

Referring to FIG. 4, a planetary gear train according to various exemplary embodiments realizes eleven forward speeds and three reverse speeds by operating two engagements among the first, second, third, and fourth clutches C1, C2, C3, and C4 and the first, second, and third brakes B1, B2, and B3.

In the first forward speed D1, the second and third brakes B2 and B3 are simultaneously operated.

As a result, the input torque is input to the first shaft TM1.

In such a state, as well as the third shaft TM3 always acting as a fixed element, seventh shaft TM7, the eighth shaft TM8 acts as a fixed element by the operation of the second and third brakes B2 and B3, realizing the first forward speed and outputting a shifted torque to the output gear OG connected to the second shaft TM2.

In the second forward speed D2, the first clutch C1 and the second brake B2 are simultaneously operated.

As a result, the first shaft TM1 and the fifth shaft TM5 are connected by the operation of the first clutch C1. In the instant state, the input torque is input to the first shaft TM1, fifth shaft TM5.

In such a state, as well as the third shaft TM3 always acting as a fixed element, the seventh shaft TM7 acts as a fixed element by the operation of the second brake B2, realizing the second forward speed and outputting a shifted torque to the output gear OG connected to the second shaft TM2.

In the third forward speed D3, the second clutch C2 and the second brake B2 are simultaneously operated.

As a result, the fourth shaft TM4 and the fifth shaft TM5 are connected by the operation of the second clutch C2. In the instant state, the input torque is input to the first shaft TM1.

In such a state, as well as the third shaft TM3 always acting as a fixed element, the seventh shaft TM7 acts as a fixed element by the operation of the second brake B2, realizing the third forward speed and outputting a shifted torque to the output gear OG connected to the second shaft TM2.

In the fourth forward speed D4, the third clutch C3 and the second brake B2 are simultaneously operated.

As a result, the first shaft TM1 and the sixth shaft TM6 are connected by the operation of the third clutch C3. In the instant state, the input torque is input to the first shaft TM1, sixth shaft TM6.

In such a state, as well as the third shaft TM3 always acting as a fixed element, the seventh shaft TM7 acts as a fixed element by the operation of the second brake B2, realizing the fourth forward speed and outputting a shifted torque to the output gear OG connected to the second shaft TM2.

In the fifth forward speed D5, the second and third clutches C2 and C3 are simultaneously operated.

As a result, the fourth shaft TM4 and the fifth shaft TM5 are connected by the operation of the second clutch C2, and the first shaft TM1 and the sixth shaft TM6 are connected by the operation of the third clutch C3. In the instant state, the input torque is input to the first shaft TM1, sixth shaft TM6.

In such a state, the third shaft TM3 always acts as a fixed element, realizing the fifth forward speed and outputting a shifted torque to the output gear OG connected to the second shaft TM2.

In the sixth forward speed D6, the first and third clutches C1 and C3 are simultaneously operated.

As a result, the first shaft TM1 and the fifth shaft TM5 are connected by the operation of the first clutch C1, and the first shaft TM1 and the sixth shaft TM6 are connected by the operation of the third clutch C3. In the instant state, the input torque is input to the first shaft TM1, the fifth shaft TM5, and the sixth shaft TM6.

As such, the second planetary gear set PG2 integrally rotates by simultaneous input from the fifth shaft TM5 and the sixth shaft TM6 and outputs an input torque, realizing the fifth forward speed and outputting a shifted torque to the output gear OG connected to the second shaft TM2.

In the seventh forward speed D7, the third clutch C3 and the third brake B3 are simultaneously operated.

As a result, the first shaft TM1 and the sixth shaft TM6 are connected by the operation of the third clutch C3. In the instant state, the input torque is input to the first shaft TM1 and the sixth shaft TM6.

In such a state, as well as the third shaft TM3 always acting as a fixed element, the eighth shaft TM8 acts as a fixed element by the operation of the third brake B3, realizing the seventh forward speed and outputting a shifted torque to the output gear OG connected to the second shaft TM2.

In the eighth forward speed D8, the third and fourth clutches C3 and C4 are simultaneously operated.

As a result, the first shaft TM1 and the sixth shaft TM6 are connected by the operation of the third clutch C3, and the fourth shaft TM4 and the seventh shaft TM7 are connected by the operation of the fourth clutch C4. In the instant state, the input torque is input to the first shaft TM1 and the sixth shaft TM6.

In such a state, the third shaft TM3 always acts as a fixed element, realizing the eighth forward speed and outputting a shifted torque to the output gear OG connected to the second shaft TM2.

In the ninth forward speed D9, the fourth clutch C4 and the third brake B3 are simultaneously operated.

As a result, the fourth shaft TM4 and the seventh shaft TM7 are connected by the operation of the fourth clutch C4. In the instant state, the input torque is input to the first shaft TM1.

In such a state, as well as the third shaft TM3 always acting as a fixed element, the eighth shaft TM8 acts as a fixed element by the operation of the third brake B3, realizing the ninth forward speed and outputting a shifted torque to the output gear OG connected to the second shaft TM2.

In the tenth forward speed D10, the first and fourth clutches C1 and C4 are simultaneously operated.

As a result, the first shaft TM1 and the fifth shaft TM5 are connected by the operation of the first clutch C1, and the fourth shaft TM4 and the seventh shaft TM7 are connected by the operation of the fourth clutch C4. In the instant state, the input torque is input to the first shaft TM1 and the fifth shaft TM5.

In such a state, the third shaft TM3 always acts as a fixed element, realizing the tenth forward speed and outputting a shifted torque to the output gear OG connected to the second shaft TM2.

In the eleventh forward speed D11, the second and fourth clutches C2 and C4 are simultaneously operated.

As a result, the fourth shaft TM4 and the fifth shaft TM5 are connected by the operation of the second clutch C2, and the fourth shaft TM4 and the seventh shaft TM7 are connected by the operation of the fourth clutch C4. In the instant state, the input torque is input to the first shaft TM1.

In such a state, the third shaft TM3 always acts as a fixed element, realizing the eleventh forward speed and outputting a shifted torque to the output gear OG connected to the second shaft TM2.

In the reverse first speed REV1, the first and third brakes B1 and B3 are simultaneously operated.

As a result, the input torque is input to the first shaft TM1.

In such a state, as well as the third shaft TM3 always acting as a fixed element, sixth shaft TM6, the eighth shaft TM8 acts as a fixed element by the operation of the first and third brakes B1 and B3, realizing the reverse first speed and outputting a shifted torque to the output gear OG connected to the second shaft TM2.

In the reverse second speed REV2, the first clutch C1 and the first brake B1 are simultaneously operated.

As a result, the first shaft TM1 and the fifth shaft TM5 are connected by the operation of the first clutch C1. In the instant state, the input torque is input to the first shaft TM1 and the fifth shaft TM5.

In such a state, as well as the third shaft TM3 always acting as a fixed element, the sixth shaft TM6 acts as a fixed element by the operation of the first brake B1, realizing the reverse second speed and outputting a shifted torque to the output gear OG connected to the second shaft TM2.

In the reverse third speed REV3, the second clutch C2 and the first brake B1 are simultaneously operated.

As a result, the fourth shaft TM4 and the fifth shaft TM5 are connected by the operation of the second clutch C2. In the instant state, the input torque is input to the first shaft TM1.

In such a state, as well as the third shaft TM3 always acting as a fixed element, the sixth shaft TM6 acts as a fixed element by the operation of the first brake B1, realizing the reverse third speed and outputting a shifted torque to the output gear OG connected to the second shaft TM2.

As described above, a planetary gear train according to various exemplary embodiments of the present invention may realize at least eight forward speeds and at least two reverse speeds by operating three or four planetary gear sets by controlling engagement elements of four clutches and two brakes or engagement elements of four clutches and three brakes.

Furthermore, a planetary gear train according to an exemplary embodiment of the present invention may substantially improve driving stability by realizing shifting stages appropriate for rotation speed of an engine due to multi-stages of an automatic transmission.

Furthermore, a planetary gear train according to an exemplary embodiment of the present invention maximize engine driving efficiency by multi-stages of an automatic transmission, and may improve power delivery performance and fuel consumption.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A planetary gear train apparatus of an automatic transmission for a vehicle, the apparatus comprising:
    an input shaft receiving an engine torque;
    an output gear for outputting a shifted torque;
    a first planetary gear set having a first rotation element, a second rotation element, and a third rotation element;
    a second planetary gear set having a fourth rotation element, a fifth rotation element, and a sixth rotation element;
    a third planetary gear set having a seventh rotation element, an eighth rotation element, and a ninth rotation element;
    a first shaft fixedly connected to the second rotation element and the input shaft;
    a second shaft fixedly connected to the sixth rotation element, the eighth rotation element, and the output gear;
    a third shaft fixedly connected to the first rotation element and a transmission housing;
    a fourth shaft fixedly connected to the third rotation element;
    a fifth shaft fixedly connected to the fourth rotation element and the seventh rotation element;
    a sixth shaft fixedly connected to the fifth rotation element; and
    a seventh shaft fixedly connected to the ninth rotation element.

2. The planetary gear train apparatus of claim 1, further including:
    four clutches each selectively connecting a corresponding pair among the first to seventh shafts; and
    two brakes each selectively connecting a corresponding shaft among the first to seventh shafts to the transmission housing.

3. The planetary gear train apparatus of claim 2, wherein the four clutches comprise:
    a first clutch mounted between the first shaft and the fifth shaft;
    a second clutch mounted between the fourth shaft and the fifth shaft;
    a third clutch mounted between the first shaft and the sixth shaft; and
    a fourth clutch mounted between the fourth shaft and the seventh shaft, and
    wherein the two brakes comprise:
    a first brake mounted between the sixth shaft and the transmission housing; and
    a second brake mounted between the seventh shaft and the transmission housing.

4. The planetary gear train apparatus of claim 1, further including:
    a fourth planetary gear set having a tenth rotation element, an eleventh rotation element, and a twelfth rotation element; and
    an eighth shaft fixedly connected to the tenth rotation element,
    wherein the eleventh rotation element and the second rotation elements are fixedly connected to the first shaft, and
    wherein the twelfth rotation element is fixedly connected to the fifth shaft.

5. The planetary gear train apparatus of claim 4, further including:
    four clutches each selectively connecting a corresponding pair among the first to eight shafts; and
    three brakes each selectively connecting a corresponding shaft among the first to eight shafts to the transmission housing.

6. The planetary gear train apparatus of claim 5, wherein the four clutches comprise:
    a first clutch mounted between the first shaft and the fifth shaft;
    a second clutch mounted between the fourth shaft and the fifth shaft;
    a third clutch mounted between the first shaft and the sixth shaft; and
    a fourth clutch mounted between the fourth shaft and the seventh shaft, and
    wherein the three brakes comprise:
    a first brake mounted between the sixth shaft and the transmission housing;
    a second brake mounted between the seventh shaft and the transmission housing; and
    a third brake mounted between the eighth shaft and the transmission housing.

7. The planetary gear train apparatus of claim 4, wherein
    the first planetary gear set is a single pinion planetary gear set having a first sun gear, a first planet carrier, and a first ring gear as the first rotation element, the second rotation element, and the third rotation element, respectively;
    the second planetary gear set is a single pinion planetary gear set having a second sun gear, a second planet carrier, and a second ring gear as the fourth rotation element, the fifth rotation element, and the sixth rotation element, respectively;
    the third planetary gear set is a single pinion planetary gear set having a third sun gear, a third planet carrier, and a third ring gear as the seventh rotation element, the eighth rotation element, and the ninth rotation element, respectively; and
    the fourth planetary gear set is a double pinion planetary gear set having a fourth sun gear, a fourth planet carrier, and a fourth ring gear as the tenth rotation element, the eleventh rotation element, and the twelfth rotation element, respectively.

8. The planetary gear train apparatus of claim 4, wherein the first, second, third and fourth planetary gear sets are disposed on the input shaft in an order of the second, third, fourth, and first planetary gear sets from an engine side.

9. The planetary gear train apparatus of claim 1, wherein the first planetary gear set is a single pinion planetary gear set having a first sun gear, a first planet carrier, and a first ring gear as the first rotation element, the second rotation element, and the third rotation element, respectively;

the second planetary gear set is a single pinion planetary gear set having a second sun gear, a second planet carrier, and a second ring gear as the fourth rotation element, the fifth rotation element, and the sixth rotation element, respectively; and the third planetary gear set is a single pinion planetary gear set having a third sun gear, a third planet carrier, and a third ring gear as the seventh rotation element, the eighth rotation element, and the ninth rotation element, respectively.

10. A planetary gear train apparatus of an automatic transmission for a vehicle, the apparatus comprising:
an input shaft receiving an engine torque;
an output gear for outputting a shifted torque;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element;
a first shaft fixedly connected to the second rotation element and the input shaft;
a second shaft fixedly connected to the sixth rotation element, the eighth rotation element, and the output gear;
a third shaft fixedly connected to the first rotation element and a transmission housing;
a fourth shaft fixedly connected to the third rotation element;
a fifth shaft fixedly connected to the fourth rotation element and the seventh rotation element; and
a plurality of shafts each selectively connecting a corresponding element to the transmission housing, the corresponding element being a rotation element of the first, second, and third planetary gear sets which is not fixedly interconnected, among the first to ninth rotation elements.

11. The planetary gear train apparatus of claim 10, wherein the plurality of shafts includes:
a sixth shaft fixedly connected to the fifth rotation element; and
a seventh shaft fixedly connected to the ninth rotation element.

12. The planetary gear train apparatus of claim 11, further including:
a first clutch mounted between the first shaft and the fifth shaft;
a second clutch mounted between the fourth shaft and the fifth shaft;
a third clutch mounted between the first shaft and the sixth shaft; and
a fourth clutch mounted between the fourth shaft and the seventh shaft.

13. The planetary gear train apparatus of claim 12, further including:
a first brake mounted between the sixth shaft and the transmission housing; and
a second brake mounted between the seventh shaft and the transmission housing.

14. The planetary gear train apparatus of claim 10, further including:

a fourth planetary gear set having a tenth rotation element, an eleventh rotation element, and a twelfth rotation element,
wherein the first shaft is fixedly connected to the eleventh rotation element and the second rotation element, and
wherein the fifth shaft is fixedly connected to the twelfth rotation element.

15. The planetary gear train apparatus of claim 14, wherein the plurality of shafts includes:
a sixth shaft fixedly connected to the fifth rotation element;
a seventh shaft fixedly connected to the ninth rotation element; and
an eighth shaft fixedly connected to the tenth rotation element.

16. The planetary gear train apparatus of claim 15, further including:
a first clutch mounted between the first shaft and the fifth shaft;
a second clutch mounted between the fourth shaft and the fifth shaft;
a third clutch mounted between the first shaft and the sixth shaft; and
a fourth clutch mounted between the fourth shaft and the seventh shaft.

17. The planetary gear train apparatus of claim 15, further including:
a first brake mounted between the sixth shaft and the transmission housing;
a second brake mounted between the seventh shaft and the transmission housing; and
a third brake mounted between the eighth shaft and the transmission housing.

18. The planetary gear train apparatus of claim 14,
wherein the first planetary gear set is a single pinion planetary gear set having a first sun gear, a first planet carrier, and a first ring gear as the first rotation element, the second rotation element, and the third rotation element, respectively;
wherein the second planetary gear set is a single pinion planetary gear set having a second sun gear, a second planet carrier, and a second ring gear as the fourth rotation element, the fifth rotation element, and the sixth rotation element, respectively;
wherein the third planetary gear set is a single pinion planetary gear set having a third sun gear, a third planet carrier, and a third ring gear as the seventh rotation element, the eighth rotation element, and the ninth rotation element, respectively; and
wherein the fourth planetary gear set is a double pinion planetary gear set having a fourth sun gear, a fourth planet carrier, and a fourth ring gear as the tenth rotation element, the eleventh rotation element, and the twelfth rotation element, respectively.

19. The planetary gear train apparatus of claim 14, wherein the first, second, third and fourth planetary gear sets are disposed on the input shaft in an order of the second, third, fourth, and first planetary gear sets from an engine side.

20. The planetary gear train apparatus of claim 10, wherein
the first planetary gear set is a single pinion planetary gear set having a first sun gear, a first planet carrier, and a first ring gear as the first rotation element, the second rotation element, and the third rotation element, respectively;

the second planetary gear set is a single pinion planetary gear set having a second sun gear, a second planet carrier, and a second ring gear as the fourth rotation element, the fifth rotation element, and the sixth rotation element, respectively; and the third planetary gear set is a single pinion planetary gear set having a third sun gear, a third planet carrier, and a third ring gear as the seventh rotation element, the eighth rotation element, and the ninth rotation element, respectively.

* * * * *